June 30, 1959

V. D. HERY 2,892,438

PAN SPRAYING MACHINE

Filed June 30, 1955

INVENTOR.
BY Vincent D. Hery.
Wood, Herron & Evans.
ATTORNEYS.

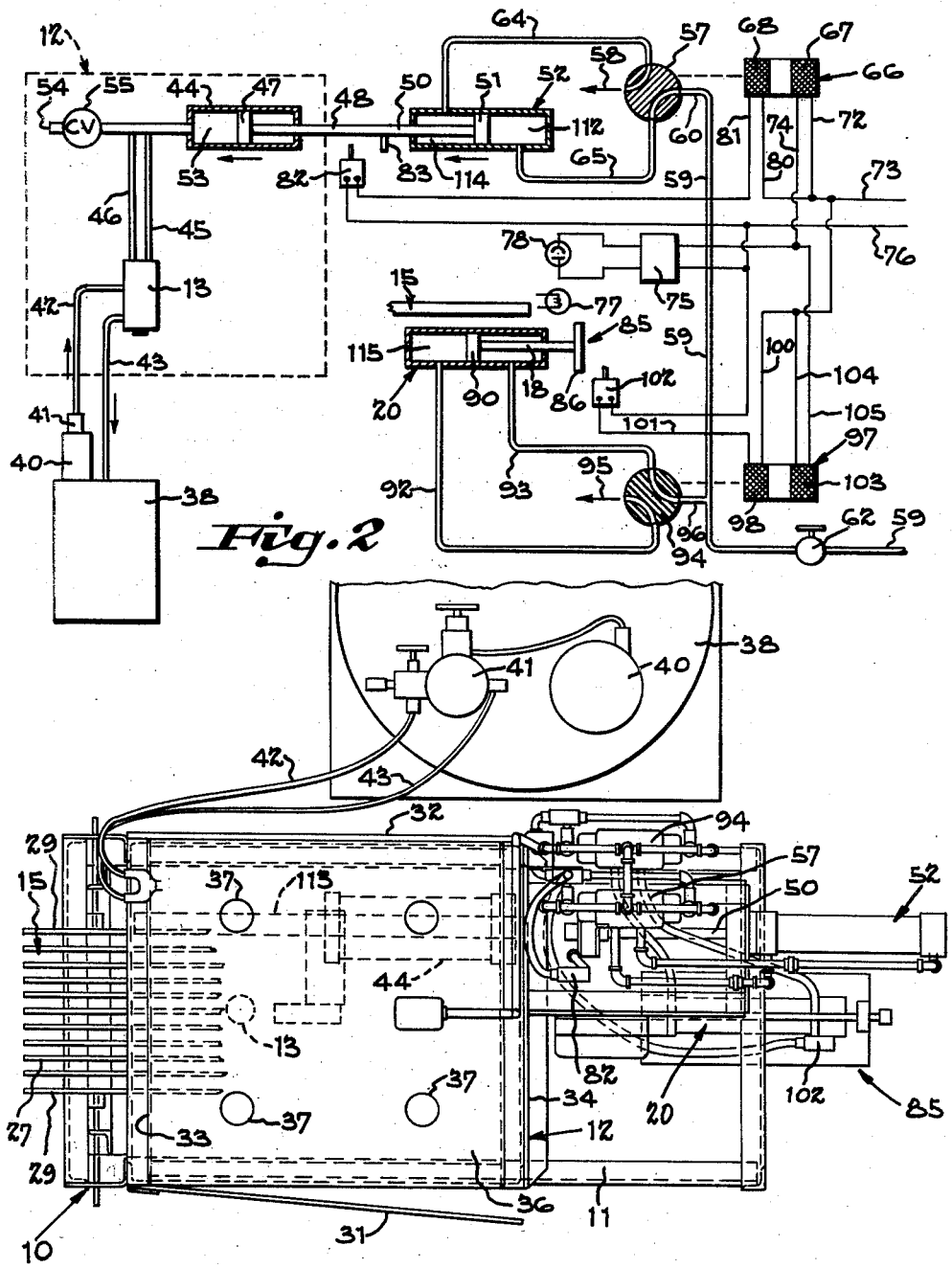

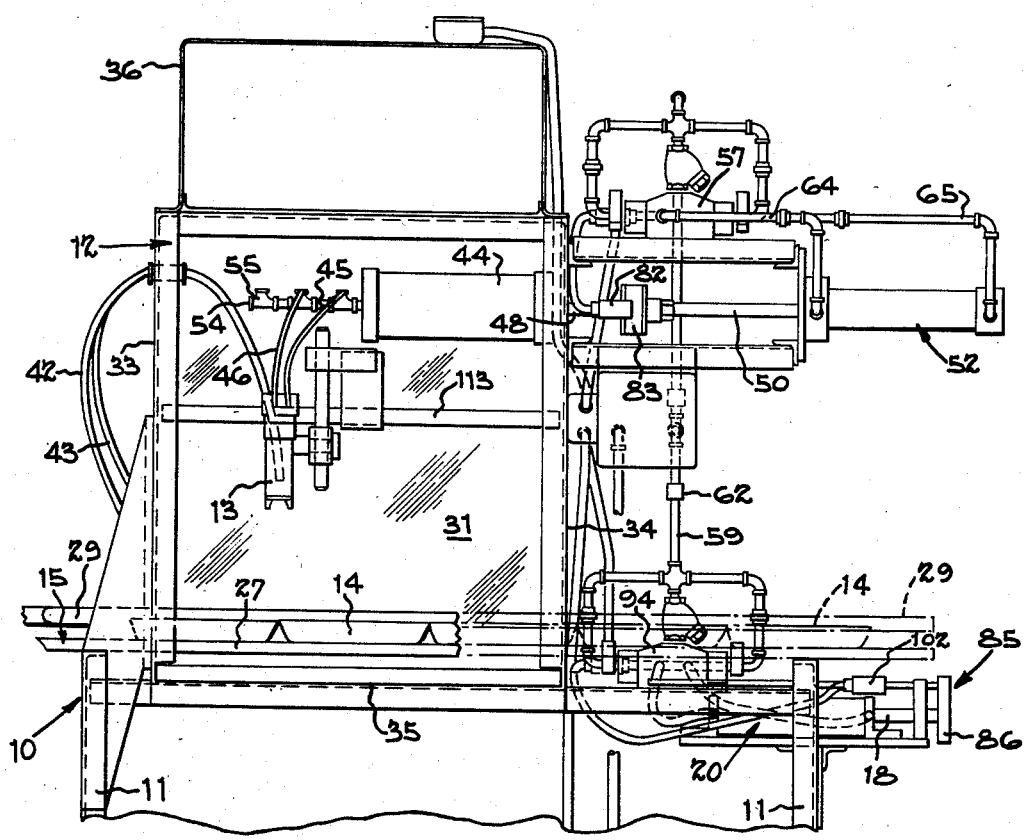

United States Patent Office 2,892,438
Patented June 30, 1959

2,892,438

PAN SPRAYING MACHINE

Vincent D. Hery, Norwood, Ohio, assignor to The American Tool Works Company, Cincinnati, Ohio, a corporation of Ohio Application June 30, 1955, Serial No. 519,039

9 Claims. (Cl. 118—2)

This invention relates to machines for spray-coating articles and is particularly directed to a machine for applying a thin coat of grease to aluminum foil baking pans and the like.

At the present time, large numbers of aluminum foil pans are used in bakeries and other food-processing plants, and a foil pan manufacturer may produce as many as 200,000 pans in a day. It has been found desirable for the manufacturers of these pans to supply them to bakeries in a greased condition ready for use. It will be readily appreciated that the problems involved in greasing such a large number of relatively fragile baking pans are quite different from the problems involved in greasing a few hundred, or at most a few thousand, pans in a bakery.

One of the principal difficulties encountered in spraying such a large number of pans is the problem of vaporized grease escaping from the spray booth. In the past, grease spraying machines have permitted considerable quantities of air laden with vaporized grease particles to escape from the machine into the room in which pans are being greased. This escaping grease is deposited on the walls of the room and on equipment stationed in the room. Not only does this create an unsightly and unsanitary condition, but, in addition, is very uneconomical since substantial amounts of grease are wasted.

The principal object of the present invention is to provide a grease spraying machine which substantially eliminates the escape of grease from the machine. The present apparatus is especially adapted for spraying large numbers of aluminum foil pans; although it will be understood that the machine provides advantages which render it advantageous for use in other spraying installations as well.

The present invention is predicated upon the concept of substantially eliminating the escape of grease by spraying the pans within a closed booth and utilizing the air within the booth to atomize grease within a grease spray nozzle. The air is thus recycled from the nozzle into the booth and back through the nozzle. In this manner, no additional air is supplied to the booth, and no appreciable amount of air escapes from the booth into the surrounding room.

A preferred form of pan spraying machine constructed in accordance with the present invention includes a conveyor for feeding pans onto a stationary support surface which extends through suitable openings in the walls of a spray booth. A grease nozzle is mounted within the spray booth and is adapted to apply a quantity of vaporized grease to each pan as it is brought into registry with the nozzle.

More specifically, the grease nozzle includes a fluid-actuated trigger effective to admit a predetermined quantity of grease to the nozzle, the grease being atomized within the nozzle by means of a stream of compressed air. In the present device, this stream of compressed air is supplied from a cylinder, the cylinder being adapted to withdraw air from the booth on its return stroke and to compress air and force it through the nozzle on its forward stroke. No additional air is introduced into the spray nozzle or booth.

The present invention is also directed to means for bringing the pans into registry with the grease nozzle so that each of the pans receives a uniform coating of grease. More specifically, in the present machine each pan receives two applications of grease from the nozzle. The pans move in an intermittent manner through the spray booth in endwise abutment with one another. Each pan stops with its leading edge disposed directly under the spray nozzle which is actuated to apply a coating of grease to the forward portion of the pan and the rear portion of the preceding pan. After its next advancement, the pan is stopped with its rear edge under the nozzle so that the rear portion of the pan receives an application of grease together with the leading edge of the succeeding pan.

The pans are accurately positioned relative to the grease gun without the use of stop fingers or the like which might injure a foil pan. In the preferred embodiment, the pans are slid onto the stationary support surface from a feed conveyor which includes abutments in engagement with the pans, the abutments being effective to position each successive pan on the feed surface in precisely the same location. Since the pans are advanced one pan length at a time, and the grease nozzle is spaced an integral number of pan lengths from the end of the conveyor, after each movement of the pans one pair of pans is disposed with their abutting edges beneath a nozzle. At the discharge end of the horizontal support surface, the pans are dropped onto a stacking mechanism and in so doing interrupt a light beam, triggering a photoelectric relay which in turn actuates the air cylinder and grease gun so that an application of grease is applied to the pans positioned beneath the gun.

One of the principal advantages of the present machine is that substantially all leakage of grease into the surrounding area is eliminated and no objectionable grease deposits are formed on adjacent walls and equipment.

A further advantage of the present spraying machine is that a substantial economy is effected in the consumption of grease. For example, it has been found that a machine of the present invention utilizes only about one-half as much grease as machines of the type previously employed.

Another advantage of the present invention is that pans may be sprayed at a very rapid rate, for example, 2,400 pans per hour, without in any way damaging or deforming the relatively thin-walled aluminum foil pans.

Another advantage to the present machine is that pans receive an extremely uniform coating of grease even when the machine is operated at a relatively high production rate.

These and other objects and advantages of the present invention will be more readily apparent from a consideration of the following detailed description of the drawings illustrating a preferred embodiment of the invention.

In the drawings:

Figure 2 is a schematic diagram of the air, grease, and electrical systems of the spraying machine;

Figure 3 is a top plan view of the spraying machine; and

Figure 4 is an enlarged side view of the spray booth this view being taken from the same side as Figure 1.

Figure 1:
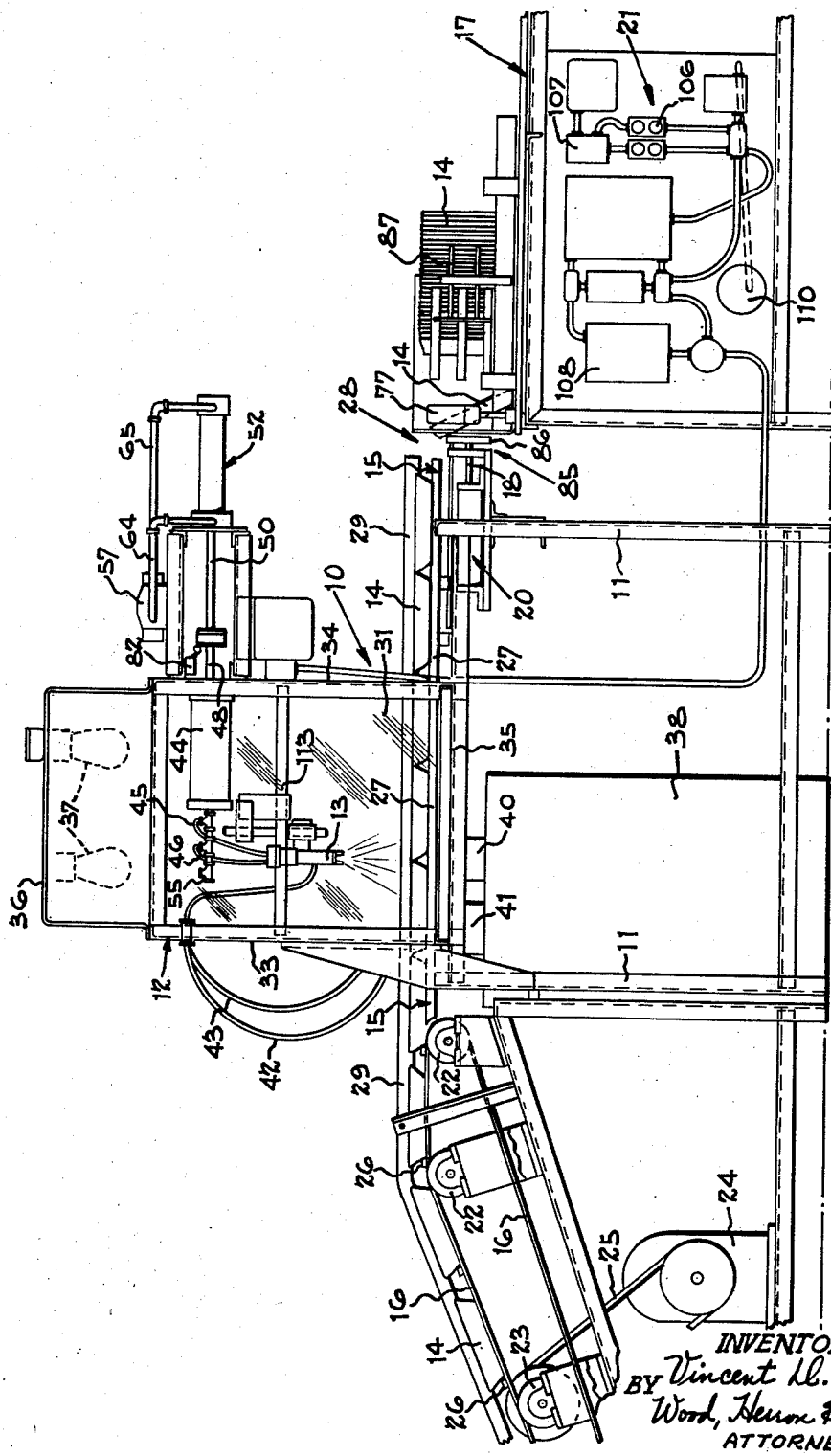
Figure 1 is a side view of a pan spraying machine constructed in accordance with the principles of this invention.

As shown in Figure 1, a spray-coating machine 10 comprises a frame 11 formed of angle irons or other suitable material and adapted to support a spray booth 12 housing a nozzle 13 by means of which grease is sprayed upon pans 14 as they travel over supporting surface 15. The pans are deposited upon supporting surface 15 from a continuous belt conveyor 16 and are discharged from the horizontal supporting surface onto a stacking table 17. The pans stand on end on this table and are stacked together into nested relationship by means of a stacking plunger 18 actuated by air cylinder 20. Frame 11 also supports a plurality of electrical and fluid controls mounted on a control panel, indicated generally at 21.

In the preferred embodiment, belt 16 is a relatively wide canvas belt, supported upon idler pulleys 22 and drive pulley 23, the drive pulley being interconnected with a motor 24 through a V-belt 25. Suitable belt-tensioning means (not shown) are provided for engagement with the canvas belt. The belt carries a plurality of transverse abutment elements, such as strips 26, which are stitched to the belt. These abutment elements are spaced apart longitudinally a distance greater than the maximum length of pan to be greased. The feed belt is adapted to receive pans as they are discharged from a pan-forming machine, or are placed on the belt by hand or by an intermediate conveyor.

The feeding belt discharges the pans onto stationary support surface 15 upon which the pans rest as they are shifted beneath the spray nozzle 13. The horizontal support surface, in the preferred embodiment, is constituted by a plurality of spaced metal strips 27. These strips extend through spray booth 12 to a discharge station 28 disposed adjacent the receiving end of stacking table 17. Two side rails 29 are provided adjacent to the edges of the support surface for guiding the pans along the surface.

Spray booth 12 is generally of rectangular cross-section and encloses a portion of supporting surface 15, spray nozzle 13, and air cylinder 44. Spray booth 12 includes front and rear walls 31 and 32, side walls 33 and 34, and a bottom wall 35. The top of the spray booth is enclosed by a hood 36 in which are mounted a plurality of infra-red or other heating lamps 37. The heat from these lamps is directed into the spray booth and is effective to prevent the grease entrapped in the air within the booth from condensing on the walls of the booth or on the other elements disposed within the booth. In the embodiment shown, the walls of the spray booth are formed of a transparent sheet material, such as glass, to facilitate supervision of the spraying operation; however, other wall material such as plastic or sheet metal may be used if desired. The two end walls of the booth are provided with suitable openings adjacent to the horizontal support surface 15 through which pans pass as they enter and are discharged from the booth. These openings are preferably only slightly larger than the cross-sectional dimensions of the pan so that escape of air and grease through the openings is minimized.

The grease-spraying mechanism for applying an even coating of grease to the pans includes nozzle 13 which can be of any suitable type in which grease is atomized by air introduced under pressure. However, in the preferred embodiment, the grease gun includes a fluid-actuated trigger effective to admit a predetermined quantity of grease each time the trigger is actuated. Grease is constantly circulated to the nozzle, bypassing the discharge orifices when the trigger has not been actuated. The precise details of this grease gun constitute no part of the present invention; one suitable form of grease gun is shown in United States Patent No. 2,371,546.

In the embodiment shown, grease is stored in a heated drum 38 and is withdrawn from the drum by means of pump 40. It is then passed through pressure regulator 41 and tube 42 to nozzle 13. When the nozzle is not discharging, grease is returned to the drum through return line 43. Air under pressure for atomizing the grease is supplied to the nozzle from air cylinder 44 through conduit 45. A second line 46 passes from cylinder 44 to nozzle 13. This latter line communicates with the pressure-responsive trigger provided in the nozzle.

Air cylinder 44 houses a piston 47 having a rod 48 interconnected with a piston rod 50 secured to piston 51 of main cylinder 52. As best shown in Figure 2, when piston 51 moves to the left, it forces piston 47 to the left, forcing compressed air through lines 44 and 46 to nozzle 13. Upon the return stroke of piston 51, piston 47 is urged to the right, and air is drawn into chamber 53 of cylinder 44 through inlet opening 54 disposed within the hood. This opening is connected to line 45 through check valve 55 which permits air to enter the cylinder from inlet opening 54 but prevents air from escaping through that opening during the pressure stroke of the piston.

Main driving piston 51 is actuated by a pilot valve 57. Pilot valve 57 includes an exhaust port 58, an air inlet opening 60 connected to a source of compressed air through air line 59, and a suitable pressure regulator 62, and two openings communicating with pipes 64 and 65 leading to opposite ends of power cylinder 52. Valve 57 is a double-solenoid controlled valve and is connected to the solenoid 66 so that when right-hand coil 67 of solenoid 66 is energized, the fluid connections are as shown diagrammatically in Figure 2, that is, with air line 59 connected to pipe 65 and exhaust port 58 connected to pipe 64. When left-hand coil 68 is energized, the fluid connections in valve 57 are such that line 65 is connected to exhaust opening 58, and line 64 is connected to the compressed air line 59.

Right-hand solenoid coil 67 includes one lead 72 which is joined to main power line 73 and a second lead 74 which is connected to one output terminal of photocell relay 75. The other power line of relay 75 is returned to the second power line 76. Relay 75 can be of any conventional type adapted to be closed upon the interruption of a beam of light passing from light source 77 to photocell 78. These last two elements are disposed adjacent to the discharge end of support surface 15 so that the beam of light is interrupted whenever a pan drops from the discharge surface onto the stacking table.

Left-hand solenoid 68 is adapted to be energized through lead 80 connected to power line 73 and lead 81 which is returned to power line 76 through micro-switch 82. Micro-switch 82 is disposed adjacent to piston rod 48 and is adapted to be actuated by a projection 83 carried by that rod when piston 47 nears the end of its compression stroke.

Stacking mechanism 85 includes a horizontal table 17 and a pneumatically actuated pusher plate 86 adapted to engage the bottom of each pan as the pan drops from supporting surface 15 onto the stacking table, and to push the pan into nested relationship with the pans 14 which have previously been stacked. The movement of the stacked pans along table 17 is retarded by means of springs 87 which brush against the side edges of the stacked pans. Pusher plate 86 is mounted upon the end of rod 18 carried by piston 90, the piston in turn being housed within cylinder 20. Stacking cylinder 20 is connected to air conduits 92 and 93 which communicate with opposite ends of the cylinder and are connected to a solenoid-controlled pilot valve 94 of the same construction as valve 57. Valve 94 includes an exhaust port 95 and an inlet connection 96 joining the valve with air pressure line 59. In addition, the valve includes ports providing connection to lines 92 and 93. The valve is operated by a reversible solenoid 97. Left-hand coil 98 of the solenoid is effective to position the valve so that the connections are as shown in Figure 2, that is, with conduit 93 connected to air line 59 and conduit 92 connected to exhaust port 95. Coil 98 of the solenoid is energized through lead 100 which is joined to main power line 73 and lead 101 which is returned to power line 76 through microswitch 102, the micro-switch being disposed for engagement with pusher plate 86 as piston 20 nears the end of its forward stroke. The right-hand coil 103 of solenoid 97 is adapted to be energized through lead 104 connected to power line 73, and lead 105 connected to one terminal of relay 75, the other terminal of the relay being connected to power line 76 as explained above. Solenoid coil 97, when energized, is effective to shift the valve to a position in which conduit 93 is connected to exhaust port 95, while air inlet 96 is connected to line 92. When the valve is in this position, compressed air is introduced behind piston 20, forcing that piston and pusher plate 86 to the right.

As shown in Figure 1, suitable switches 106 and fuses 107 are provided for controlling the energization of heating lamps 37 and conveyor motor 24. In addition, a counter 108 is provided for counting the number of pans stacked, and a buzzer 110 or other signalling device is provided for indicating to the operator when a predetermined number of pans has been stacked. Since these elements constitute no part of the present invention, their construction and operation will not be described in detail.

In operation, pans are placed upon feed conveyor 16. In the event that the pans are not evenly spaced when they are placed upon this conveyor, the pans are separated from one another by action of transverse strips 26 which engage the rear wall of each pan. The pans are shifted from the end of conveyor 16 onto stationary support surface 15. As shown in Figure 1, the pans remain in endwise abutment on the support surface and are shifted along surface 15 one pan length as each new pan is forced onto the surface. As each pan drops from the end of surface 15 onto the stacking table, it interrupts the beam of light passing from lamp 77 to photocell 78. This trips relay 75, energizing the right-hand coil 67 of solenoid 66 which positions valve 57, as shown in Figure 2. Consequently, air passes through the valve from air line 59 to conduit 65 and to right-hand chamber 112 of cylinder 52. This forces piston 51 to the left and simultaneously forces piston 47 to the left. Compressed air is forced from chamber 53 of cylinder 44 through lines 45 and 46 to nozzle 13. The air passing through line 46 opens the trigger, admitting grease under pressure from line 42 into the nozzle 13 where the grease is atomized by the air stream from line 45 and sprayed into pans 14. Pans 14 are disposed so that the front and rear edges of two abutting pans are directly beneath the nozzle. Thus, the front half of each pan is coated during one spray application, and the trailing half of the pan is coated during the next subsequent spray application. In order for the device to accommodate pans of different lengths, nozzle 13 is shifted along its mounting bar 113 so that it is disposed above the ends of abutting pans when the pans are at rest, that is, so that it is disposed an integral number of pan lengths from the discharge end of conveyor 16.

When pistons 51 and 47 near the end of their stroke, abutment 83 trips switch 82 to energize solenoid coil 66 which actuates valve 57 to connect line 65 to exhaust port 58 and line 64 with air pressure line 59. Air is thus introduced into chamber 114 of power cylinder 52, forcing piston 51 to the right. As piston 51 moves to the right, piston 47 is carried with it, and air is drawn in through opening 54 to chamber 53 of cylinder 44. It is this air which is expelled from the cylinder and forced through nozzle 13 upon the next actuation of the spray mechanism. As a result of this action, the grease-filled air is constantly recycled through the nozzle, and consequently practically no air or grease escape from the booth into the surrounding atmosphere.

At the same time that a falling pan breaks the beam of light between lamp 77 and photocell 78 energizing relay 75 and solenoid coil 67, coil 103 of relay 97 is energized. This is effective to operate valve 94 so that line 93 is connected with exhaust port 95 and line 92 is connected to the air supply line 59. Air is thus introduced to chamber 115 of stacking cylinder 20 to force piston 90 to the right. Pusher plate 86 engages the bottom surface of the pan which rests on one end wall, and pushes the pan into nested engagement with pans 14 which were previously dropped onto the stacking table. As pusher plate 86 nears the end of its stroke, return switch 102 is tripped to energize coil 98 and shift valve 94 to the position shown in Figure 2 in which line 92 is connected to exhaust port 95 and line 93 is connected to air line 59. This causes air to be introduced into the right-hand portion of cylinder 20 so that the pusher is retracted to its extreme left-hand position.

The spray device continues to operate in this manner, one application of grease being applied to each pan as its leading edge is brought beneath the grease gun, and a second shot being applied to the pan as its trailing edge is brought beneath the grease gun in abutment with the leading edge of the following pan. Upward of 2,400 pans per hour can be sprayed by the present apparatus. An extremely even grease coating is obtained, and yet the grease consumption is as much as 50% less than the consumption of machines previously in use.

Having described my invention, I claim:

1. In a spraying machine the combination of, a pan supporting surface, a booth for enclosing pans being sprayed, a grease spraying nozzle, an air cylinder housing a reciprocating piston, an inlet conduit communicating with said booth and with said cylinder, whereby when the piston is retracted air is withdrawn from the booth, and conduit means interconnecting said cylinder and said nozzle, whereby on the forward stroke of said piston air is forced into said nozzle, and means for supplying grease to said nozzle.

2. A grease spraying machine, comprising a spray booth, a grease nozzle disposed within said booth, a horizontal stationary pan supporting surface extending through said spray booth, an endless pan conveyor adapted to deposit pans upon said surface said conveyor including longitudinally spaced abutments adapted to force pans across said surface, said abutments being spaced apart a distance greater than the length of a pan, whereby said pans are shifted across said surface intermittently, electrical means responsive to pans leaving the discharge end of said horizontal surface, an air valve controlled by said electrically responsive means, a main cylinder having a chamber in fluid connection with said air valve and a piston reciprocable within said chamber, an air cylinder having a piston mechanically interconnected to said first named piston, conduit means providing a fluid inlet from said spray booth to said air cylinder, and conduit means providing an air outlet from said air cylinder to said grease nozzle.

3. A spraying machine, comprising a pan supporting surface, means for intermittently shifting pans across said supporting surface, a booth enclosing pans on said supporting surface, a grease spraying nozzle, an air cylinder housing a reciprocable piston, an inlet conduit communicating with said booth and with said cylinder, whereby when the piston is retracted air is withdrawn from said booth, conduit means interconnecting said cylinder and said nozzle, whereby on the forward stroke of said piston air is forced into said nozzle, means including a pressure responsive trigger for supplying grease to said nozzle, and means for shifting said piston and actuating said trigger in timed relationship with the advance of said pans.

4. A grease spraying machine, comprising a spray booth, a grease nozzle disposed within said booth, a horizontal stationary pan supporting surface extending through said spray booth, an endless pan conveyor including longitudinally spaced abutments adapted to deposit pans upon said surface and to force pans in end-to-end abutment across said surface to the discharge end thereof said abutments being spaced at a distance greater than the length of said pans, whereby said pans are advanced across said supporting surface intermittently, electrical means responsive to pans leaving the discharge end of said horizontal surface, and means actuated by said electrical means for causing intermittent operation of said grease nozzle when said pans are stationary.

5. A grease spraying machine, comprising a spray booth, a grease nozzle disposed within said booth, a horizontal stationary pan supporting surface extending through said spray booth, an endless pan conveyor including longitudinally spaced abutments adapted to deposit pans upon said surface and to force pans in end-to-end abutment across said surface to the discharge end thereof said abutments being spaced at a distance greater than the length of said pans, whereby said pans are intermittently moved across said pan supporting surface, electrical means responsive to pans leaving the discharge end of said horizontal surface, and means actuated by said electrical means for causing the operation of said grease nozzle, said discharge nozzle being spaced an integral number of pan lengths from the end of said pan conveyor whereby said grease nozzle is operated when said pans are stationary.

6. A grease spraying machine comprising a spray booth, a downwardly directed grease nozzle disposed within said booth, means for supporting pans within said booth beneath said grease nozzle, means for intermittently advancing pans past said grease nozzle, means for causing operation of said grease nozzle when a pan is stationary beneath said nozzle, said last named means including an air cylinder connected to said nozzle and having a reciprocating piston, and means for causing said piston to advance and actuate said nozzle at a predetermined time in relation to the advancement of said pans, said cylinder also being in communication with said booth whereby upon the return stroke of said piston air is withdrawn from said booth into said cylinder.

7. A grease spraying machine comprising a spray booth, a downwardly directed grease nozzle disposed within said booth, a horizontal stationary pan supporting surface extending through said booth, means for intermittently moving pans across said surface, said means comprising a continuously moving endless pan conveyor, said conveyor including longitudinally spaced abutments spaced apart a distance greater than the length of said pans, and means for intermittently operating said grease nozzle to spray said pans when said pans are stationary beneath said nozzle.

8. A grease spraying machine comprising a spray booth, a downwardly directed grease nozzle disposed within said booth, means for supporting pans within said booth beneath said grease nozzle, means for intermittently advancing pans past said grease nozzle, means for causing operation of said grease nozzle when a pan is stationary beneath said nozzle, said last named means including an air cylinder connected to said nozzle and having a reciprocating piston, and means for causing said piston to advance and actuate said nozzle at a predetermined time in relation to the advancement of said pans, said piston advancing means comprising a second cylinder having a second piston reciprocally movable therein and connected to the first named piston, an electrically responsive valve, a source of fluid pressure in fluid communication with said electrically responsive valve, said electrically responsive valve being in fluid communication with said second cylinder, whereby said electrically responsive valve is effective to control the application of fluid pressure to said second cylinder, said electrically responsive valve normally being positioned to maintain said second piston in a retracted position, electrical signal generating means responsive to a pan dropping from said pan supporting means for actuating said valve to cause said second piston to be advanced, said first cylinder also being in communication with said booth whereby upon the return stroke of said piston air is withdrawn from said both into said cylinder.

9. A grease spraying machine comprising a spray booth, a downwardly directed grease nozzle disposed within said booth, means for supporting pans within said booth beneath said grease nozzle, means for intermittently advancing pans past said grease nozzle, means for causing operation of said grease nozzle when a pan is stationary beneath said nozzle, said last named means including an air cylinder connected to said nozzle and having a reciprocating piston, and means for causing said piston to advance and actuate said nozzle at a predetermined time in relation to the advancement of said pans, said piston advancing means comprising a second cylinder having a second piston reciprocally movable therein and connected to the first named piston, an electrically responsive valve, a source of fluid pressure in fluid communication with said electrically responsive valve, said electrically responsive valve being in fluid communication with said second cylinder, whereby said electrically responsive valve is effective to control the application of fluid pressure to said second cylinder, said electrically responsive valve normally being positioned to maintain said second piston in a retracted position, electrical signal generating means responsive to a pan dropping from said pan supporting means for actuating said valve to cause said second piston to be advanced, and electrical means effective upon substantial advance of said second piston to further actuate said valve to cause retraction of said second piston, said first cylinder also being in communication with said booth whereby upon the return stroke of said piston air is withdrawn from said booth into said cylinder.

References Cited in the file of this patent

UNITED STATES PATENTS

| | | |
|---|---|---|
| 1,549,999 | Moller | Aug. 18, 1925 |
| 1,608,810 | Rasmussen et al. | Nov. 30, 1926 |
| 1,862,380 | Larson | June 7, 1932 |
| 2,551,329 | Klemola | May 1, 1951 |
| 2,616,390 | Klink | Nov. 4, 1952 |